(12) United States Patent
Takatsuka et al.

(10) Patent No.: US 6,676,280 B1
(45) Date of Patent: Jan. 13, 2004

(54) PROJECTION APPARATUS

(75) Inventors: Hiroshi Takatsuka, Kanagawa (JP); Susumu Yamada, Chiba (JP); Hiroyuki Ono, Tokyo (JP); Makoto Shinoda, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/662,770

(22) Filed: Sep. 15, 2000

(30) Foreign Application Priority Data

Sep. 17, 1999 (JP) .............................. 11-263772

(51) Int. Cl.⁷ .............................................. F21V 19/02
(52) U.S. Cl. ...................... 362/372; 362/269; 362/271; 362/287
(58) Field of Search ........................... 362/269, 271, 362/287, 375, 428; 353/87

(56) References Cited

U.S. PATENT DOCUMENTS

| | | | | |
|---|---|---|---|---|
| 4,049,346 A | * | 9/1977 | Austin | 355/45 |
| 5,722,753 A | | 3/1998 | Okada et al. | 353/119 |
| 5,826,962 A | * | 10/1998 | Rodriguez, Jr. | 353/119 |
| 5,868,483 A | * | 2/1999 | Okada et al. | 353/101 |
| 6,206,524 B1 | * | 3/2001 | Jacob | 353/119 |
| 6,280,038 B1 | * | 8/2001 | Fuse et al. | 353/57 |

FOREIGN PATENT DOCUMENTS

| | | |
|---|---|---|
| BE | 566 057 | 4/1958 |
| CH | 434 793 | 4/1967 |
| DE | 1211 001 | 2/1966 |
| DE | 1639 138 | 1/1971 |
| WO | WO 99 17158 | 4/1999 |

* cited by examiner

Primary Examiner—Stephen Husar
Assistant Examiner—Gui Young Lee
(74) Attorney, Agent, or Firm—Frommer Lawrence & Haug LLP; William S. Frommer; Leonard J. Santisi

(57) ABSTRACT

In a projection apparatus projecting an image by using light of a light source contained in a housing, there is provided a light source mounting device in which when the light source in the housing is replaced, the light source is mounted and the light source is raised from a position of an opening used for taking in and out a light source to a normal position to make positioning, so that the light source in the housing can be simply replaced.

13 Claims, 19 Drawing Sheets

PROJECTION APPARATUS

Background of the Invention

1. Field of the Invention

The present invention relates to a projection apparatus, and particularly to a projection apparatus which can efficiently replace a light source for projecting an image.

2. Description of the Related Art

In a projection apparatus, for example, three liquid crystal light valves for respectively controlling red, green and blue colors are used to synthesize the lights of these three components, and the synthesized light is enlarged and projected through a lens. This kind of liquid crystal projection apparatus is provided with a lamp as a light source to project and display an image. This lamp generates a large amount of heat and requires cooling.

In a conventional projection apparatus, a position where a light source is attached to an optical unit and a position of an opening used for taking in and out the light source at the replacement thereof are arranged side by side in the horizontal direction. The reason why the attachment position of the light source and the position of the opening used for taking in and out the light source are arranged at the same height position like this is that a housing of the projection apparatus is relatively large and the optical unit is disposed apart from a screen.

However, in recent years, by a demand for miniaturization of the projection apparatus, there is a tendency to dispose the optical unit more closely to the vicinity of the screen of the housing. Thus, the attachment position of the light source to the optical unit is naturally in the vicinity of the screen, and the attachment position of the light source to the optical unit and the opening used for taking in and out the light source are not arranged in the horizontal direction, so that it becomes impossible to simply pull the light source out in the horizontal direction to the outside of the housing and to replace the light source, as in the conventional apparatus.

The attachment position of the light source of the optical unit is located in an upper direction with respect to the position of the opening used for taking in and out the light source, and the attachment position of the light source of the optical unit is positioned at the inside of the housing with respect to the position of the opening used for taking in and out the light source, so that there is required such a mechanism that the light source is taken in from the opening used for taking in and out the light source, the light source is raised, and is positioned at the normal attachment position of the light source of the optical unit.

Therefore, the present invention has an object to solve the foregoing problem and to provide a projection apparatus which can easily replace a light source in a housing by mounting the light source and pushing up the light source to a normal position to make positioning.

SUMMARY OF THE INVENTION

According to a first aspect of the present invention, in a projection apparatus for projecting an image by using light of a light source contained in a housing, the projection apparatus is characterized by including a light source mounting device in which at the time of replacement of the light source in the housing, the light source is mounted and is raised from a position of an opening used for taking in and out a light source to a normal position to make positioning.

The light source mounting device is designed such that at the time of replacement of the light source in the housing, the light source is mounted, and is raised from the position of the opening used for taking in and out the light source to the normal position to make positioning.

By this, even if the normal position of the light source, that is, the attachment position of the light source to the optical unit is located above the opening used for taking in and out the light source, the light source can be easily replaced.

According to a second aspect of the present invention, in the above-mentioned projection apparatus, the light source mounting device includes a light source holder for holding the light source, a case for supporting the light source holder movably in the vertical direction, and a member having a cam for raising the light source holder when the case is inserted and for positioning the light source to the normal position.

The light source holder for holding the light source is supported movably in the vertical direction with respect to the case. The member having the cam raises the light source holder in the vertical direction when the case is inserted, and positions the light source to the normal position.

According to a third aspect of the present invention, in the above-mentioned projection apparatus, the light source mounting device includes a light source holder for holding the light source, and a link mechanism portion for raising the light source holder by moving the light source holder and for positioning the light source to the normal position.

The link mechanism portion moves the light source holder so that the light source holder is raised and the light source is positioned to the normal position.

According to a fourth aspect of the present invention, in the above-mentioned projection apparatus, the light source mounting device includes a light source holder for holding the light source, and a rotation operating portion for rotating the light source holder around an axis orthogonal to an optical axis of the light source to push up the light source to the normal position and to make positioning.

The rotation operating portion rotates the light source holder around the axis orthogonal to the optical axis of the light source to push up the light source to the normal position and to make positioning.

According to a fifth aspect of the present invention, in the above-mentioned projection apparatus, the light source mounting device includes a light source holder for holding the light source, and a rotation operating portion for rotating the light source holder around an axis parallel to an optical axis of the light source to push up the light source to the normal position and to make positioning.

The rotation operating portion rotates the light source holder around the axis parallel to the optical axis of the light source to push up the light source to the normal position and to make positioning.

According to a sixth aspect of the present invention, in the above-mentioned projection apparatus, the light source mounting device includes a light source holder for holding the light source, a case for supporting the light source holder movably in a direction inclined with respect to the vertical direction, and a member having a cam for raising the light source holder in the direction inclined with respect to the vertical direction when the case is inserted and for positioning the light source to the normal position.

The case supports the light source holder movably in the direction inclined with respect to the vertical direction. The member having the cam raises the light source holder in the direction inclined with respect to the vertical direction when the case is inserted and positions the light source to the normal position.

According to a seventh aspect of the present invention, in the above-mentioned projection apparatus, the member having the cam forms a duct of air, and the light source holder includes an air flow path for supplying cooling air through the member having the cam.

By supplying the cooling air through the member having the cam, cooling of the light source can be positively made.

As described above, according to the present invention, the light source is mounted and the light source is raised to the normal position to make positioning, so that the light source in the housing can be easily replaced.

DETAILED DESCRIPTION OF THE PREFERRED EMBODIMENTS

Preferred embodiments of the present invention will be described below with reference to the accompanying drawings.

Incidentally, since the embodiments described below are preferred specific examples of the present invention, various preferable technical limitations are added, but the scope of the present invention is not limited to these embodiments unless a statement of limiting the present invention appears in the following explanation.

Figure 1:
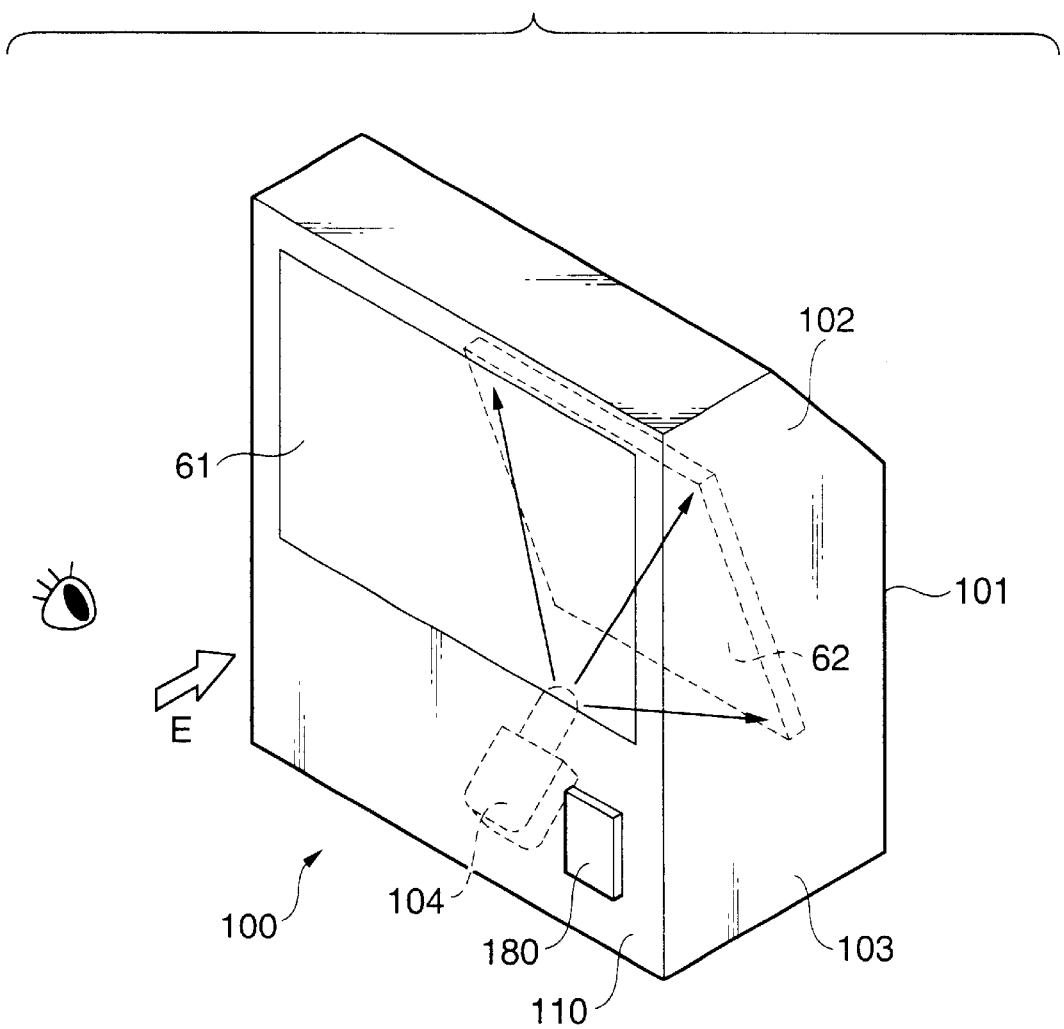
FIG. 1 is a perspective view showing the external appearance of a projection apparatus of a preferred embodiment of the present invention.

FIG. 1 is a perspective view showing the external appearance of a projection apparatus according to a preferred embodiment of the present invention.

In FIG. 1, a projection apparatus 100 includes a housing 101, and the housing 101 has a built-in mirror 62 and a built-in optical unit 104, and the like.

The housing 101 includes an upper portion 102 and a lower portion 103, and a screen 61 is provided at the front side of the upper portion 102. An image projected by the optical unit 104 is reflected by the mirror 62 and can be enlarged and projected onto the back surface side (inner surface side) of the screen 61. This projection apparatus 100 is a so-called three-plate type liquid crystal projection apparatus using three liquid crystal light valves.

Figure 2:
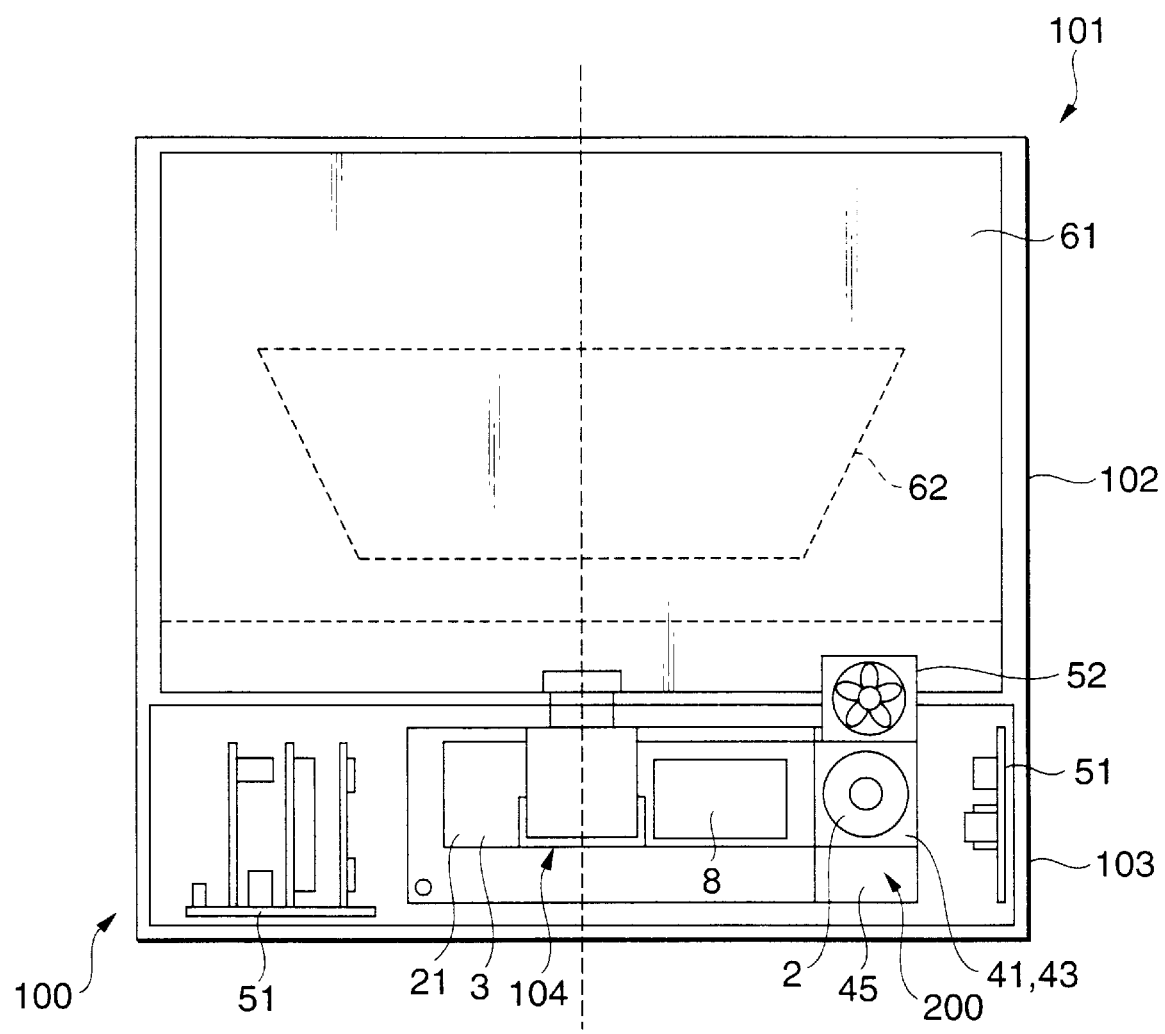
FIG. 2 is a view of the projection apparatus of FIG. 1 seen from the front and is a view showing an example of an inner structure.

FIG. 2 is a view of the projection apparatus 100 of FIG. 1 seen from the side E, and shows an example of an inner structure of the projection apparatus 100.

The upper portion 102 of the housing 101 includes the screen 61. The lower portion 103 has built-in electric circuits 51, the built-in optical unit 104, and the like. The optical unit 104 is positioned substantially at the center of the lower portion 103, and the electric circuits 51 are disposed at the right side and the left side of the optical unit 104. A fan 52 for cooling a light source and the like is provided in the vicinity of a light source 2 of the optical unit 104. By rotating the cooling fan 52, heat generated by the light source 2 and the like is released to the outside.

Figure 3:
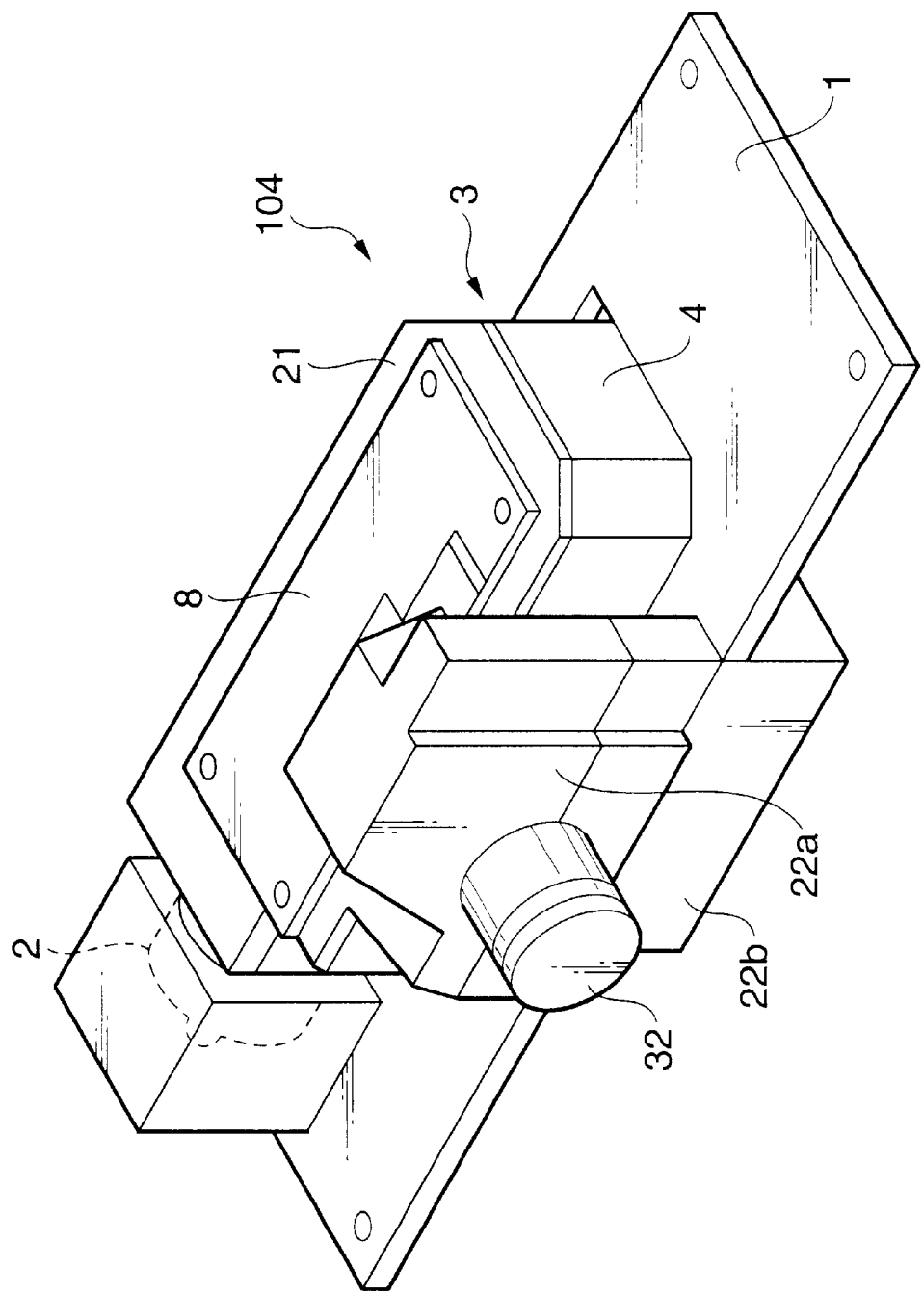
FIG. 3 is a perspective view showing an example of an optical unit used for the projection apparatus.
Figure 4:
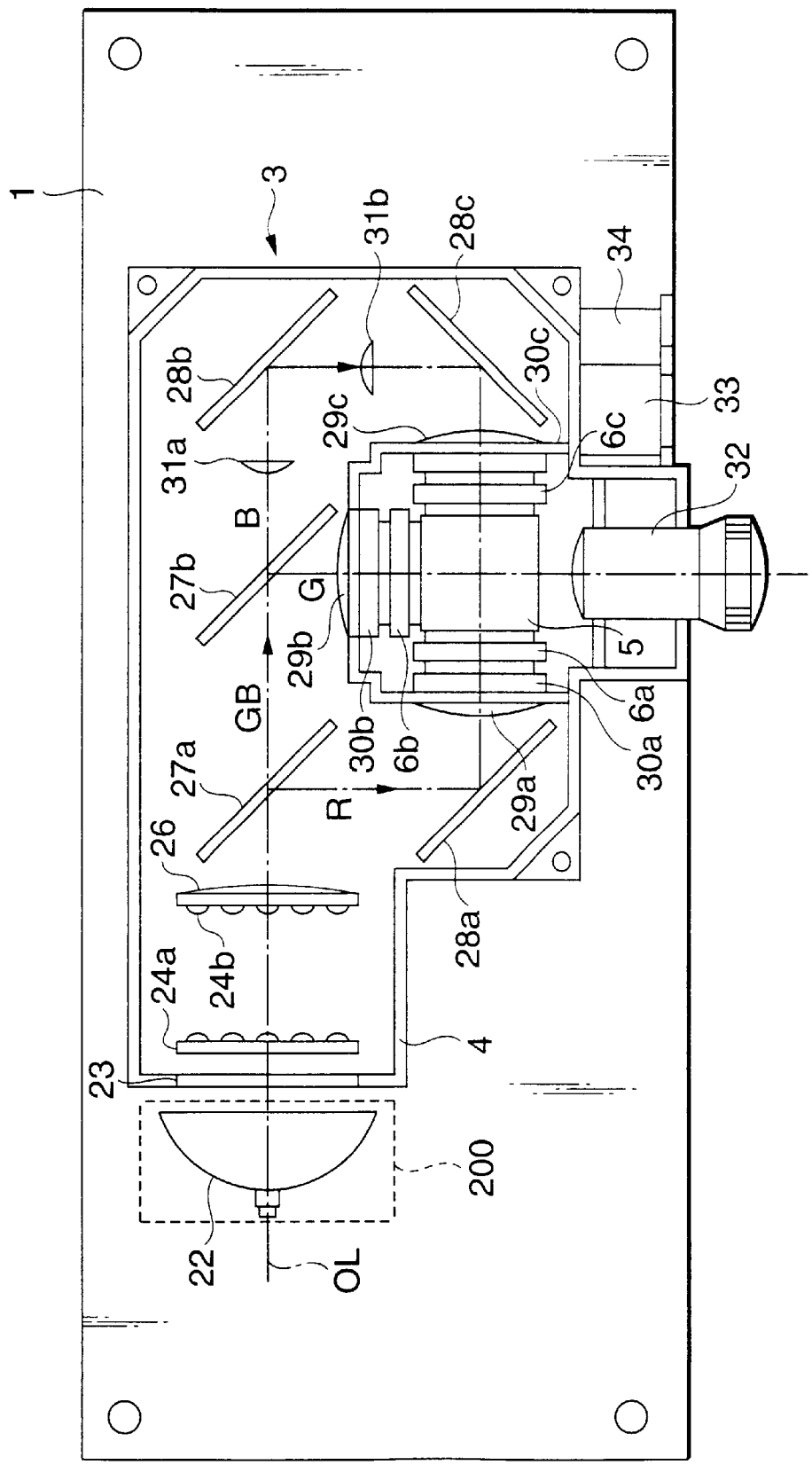
FIG. 4 is a view showing an example of an inner structure of the optical unit.

FIG. 3 shows the optical unit 104 provided in the projection apparatus 100 of FIG. 1. A light source 2 and an optical block 3 are disposed on a substrate 1 installed in the housing of the optical unit 104. The optical block 3 includes an optical block case 4, a cover 21 for closing the upper portion to the optical block case 4, an upper cover 22a positioned at the front of the optical block 3, and a lower cover 22b provided under the substrate 1 with respect to the upper cover 22a. The optical block 3 contains optical parts as shown in FIG. 4. A driving circuit 8 for driving the liquid crystal light valve is provided at the upper portion of the cover 21. The upper cover 22a is detachably attached, and when the upper cover 22a is taken off, a registration adjustment (adjustment of superposition of images) of the liquid crystal light valve can be made.

The optical block 3 includes optical parts, for example, as shown in FIG. 4. Lens arrays 24a and 24b are disposed at the side of the light source 2. Dichroic mirrors 27a and 27b and reflecting mirrors 28a, 28b and 28c, which divide light from the light source 2 into three color lights of red, green, and blue (R, G, B) and guide them to liquid crystal light valves 6a, 6b and 6c, are disposed along an optical axis OL.

The dichroic mirrors 27a and 27b and the reflecting mirrors 28a, 28b and 28c are light separation optical means of the light source 2. Condensing lenses 29a, 29b and 29c, polarizing plates 30a, 30b and 30c, and the liquid crystal light valves 6a, 6b and 6c are disposed in paths along which the divided three color lights travel, respectively. The three color lights are separately made incident on respective surfaces of a synthesizing prism 5 as subsequent stage synthesizing optical means. A projection lens 32 as projection optical means for enlarging and projecting synthesized light is provided at the subsequent stage of the synthesizing prism 5.

Here, the operation of the optical block 3 will be described.

Illumination light from the light source 2 such as a metal halide lamp is transmitted through a cut filter 23 for blocking out ultraviolet rays and infrared rays, and is incident on the inside of the optical block 3.

The illumination light incident on the optical block 3 is transmitted through the lens arrays 24a and 24b, red light R is separated and reflected by the dichroic mirror 27a, the separated red light R is reflected by the reflecting mirror 28a, and the red right is transmitted through the condensing lens 29a and the polarizing plate 30a and is transmitted through the liquid crystal light valve 6a for red.

With respect to the illumination light transmitted through the dichroic mirror 27a, that is, green light G and blue light B, the green light G is separated and reflected by the dichroic mirror 27b, and the separated green light G is transmitted through the condensing lens 29b and the polarizing plate 30b and is transmitted through the liquid crystal light valve 6b for green.

On the other hand, the blue light B transmitted through the dichroic mirror 27b passes through the lens 31a, is reflected by the reflecting mirror 28b, passes through the lens 31b, is reflected by the reflecting mirror 28c, is transmitted through the condensing lens 29c and the polarizing plate 30c, and is transmitted through the liquid crystal light valve 6c for blue. The liquid crystal light valves 6a, 6b and 6c are respectively driven by the driving circuit 8 on the basis of image signals of red, green and blue, and respectively light modulate red light, green light and blue light. Thereafter, the lights transmitted through the three color liquid crystal light valves 6a, 6b and 6c are color synthesized by the synthesizing prism 5, and are enlarged and projected by the projection lens 32 onto the screen 61 of FIG. 2. In this way, an image is displayed on the screen by the optical block 3.

Figure 5:
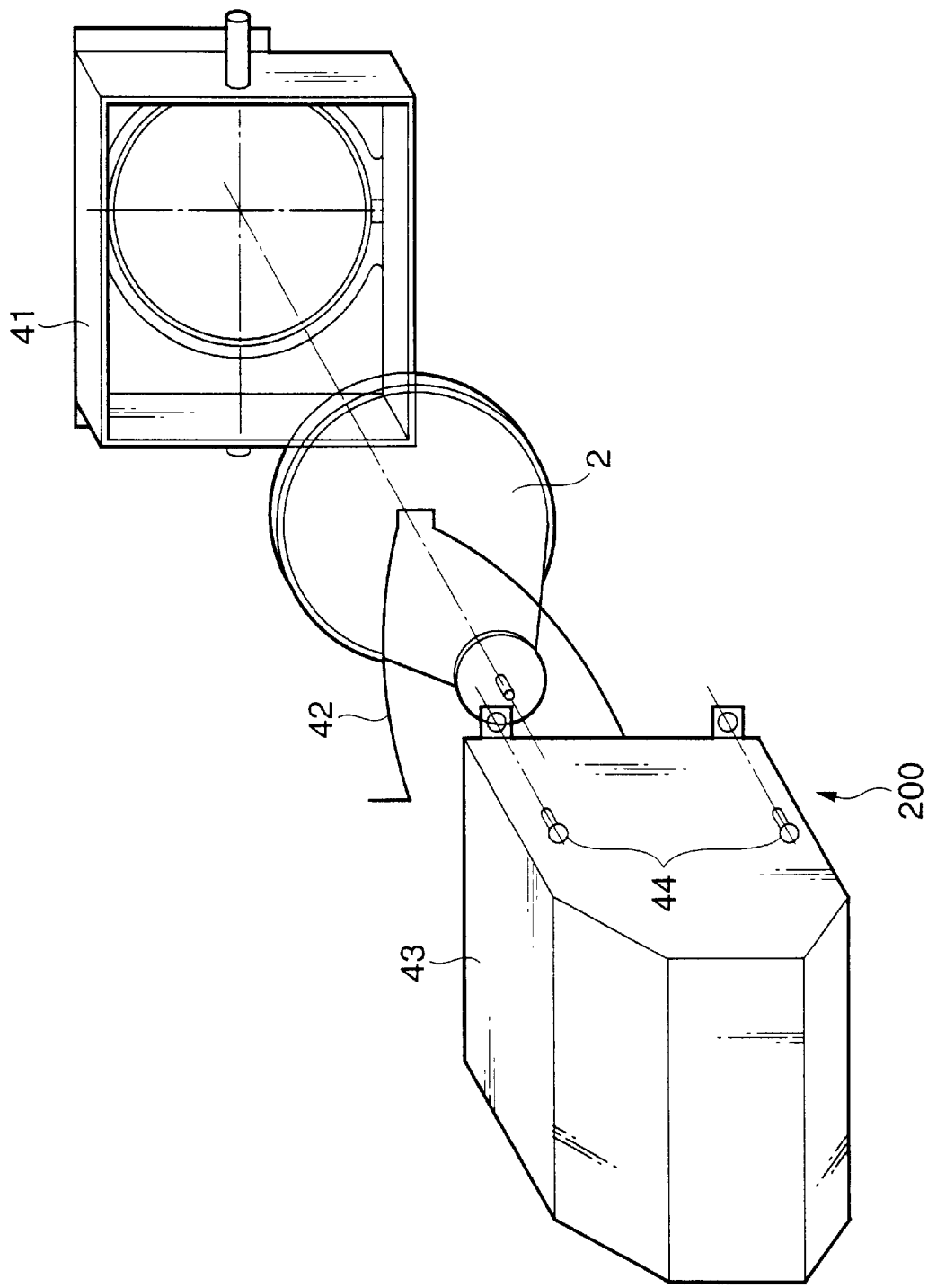
FIG. 5 is a perspective view showing a structural example of a light source portion.

FIG. 5 shows a structural example of the light source portion 200 of FIG. 4. The light source portion 200 includes a light source holder 41, a fixing spring 42, a light source case 43, and the like. The light source 2 is held by the fixing spring 42 to the light source holder 41. The light source case 43 is provided in order to prevent the light source 2 from being damaged by an outer force or to prevent a user from directly touching the heated light source 2. The light source case 43 is fastened by a screw 44 to the light source holder 41 so that they are united.

Figure 6:
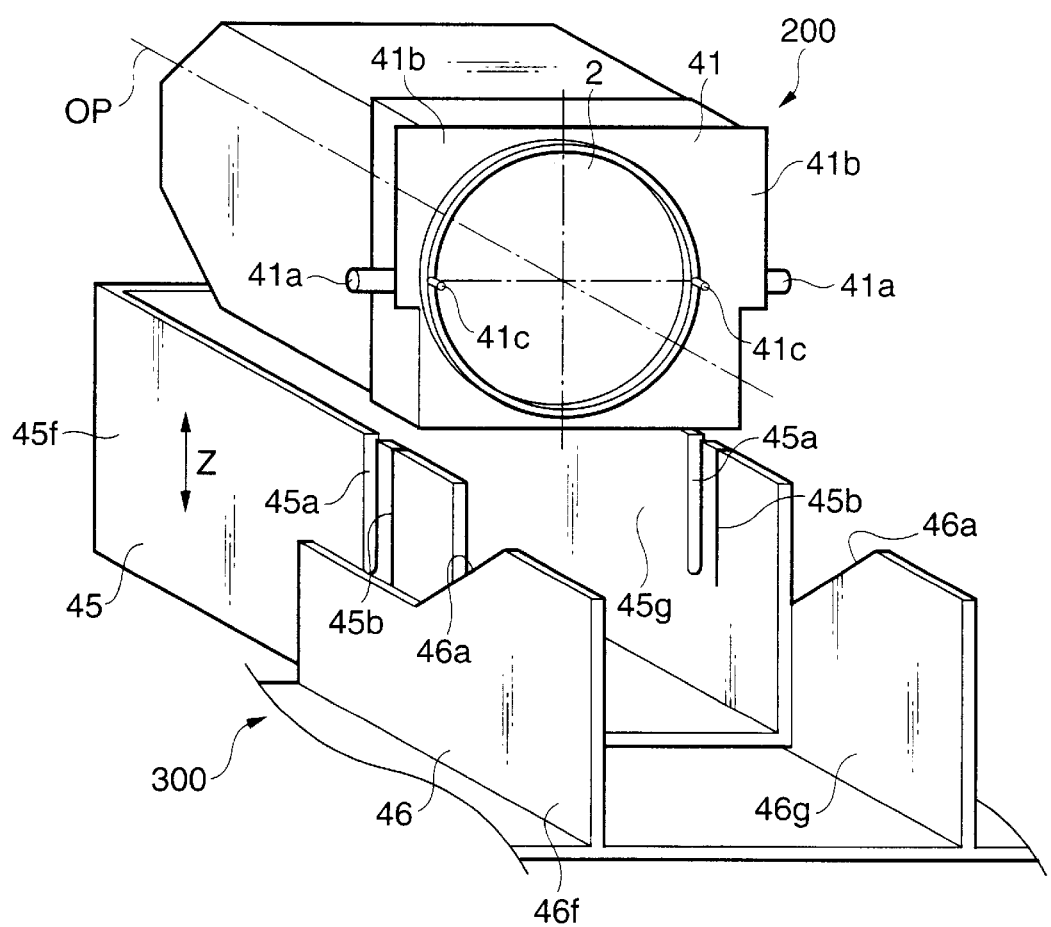
FIG. 6 is an exploded perspective view showing an embodiment of a light source mounting device for raising a light source portion to make positioning.

FIG. 6 shows an example of a light source mounting device 300 for pushing up the light source portion 200 to make positioning at the time of replacing the light source 2 of FIG. 5.

This light source mounting device 300 is a device in which the light source 2 of the light source portion 200 is mounted, and positioning is made by pushing up the light source from a position of an opening used for taking in and out a light source to a normal position of the light source. In the case where the light source 2 in the housing 101 of FIG. 2 is replaced, like this, the light source 2 must be raised from the opening used for taking in and out the light source to the normal position of the light source to make positioning.

The light source mounting device 300 roughly includes the foregoing light source holder 41, a case 45, and a member 46 having a cam.

The light source holder 41 is square or rectangular, and has two pins 41a and 41a. The two round bar pins 41a and 41a are positioned at left-right symmetric positions with respect to the optical axis OP of the light source 2. Besides, two ribs 41b and 41b are formed in the vertical direction at left-right symmetric positions with respect to the optical axis OP.

Figure 7:
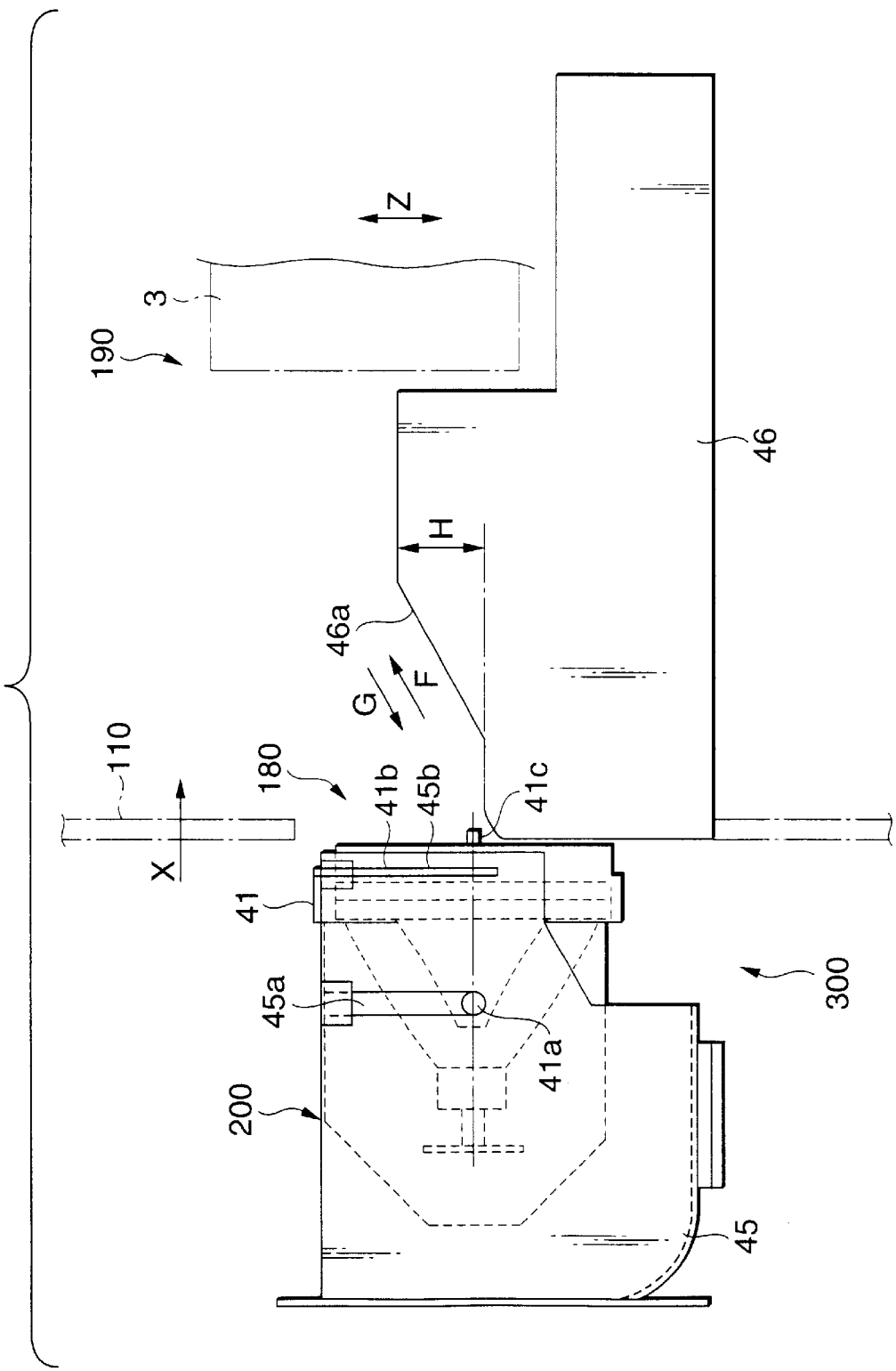
FIG. 7 is a view showing a state where the light source portion of the light source mounting device of FIG. 6 is positioned at an opening used for taking in and out a light source.

As shown in FIG. 7, the case 45 is a case which can accommodate the light source portion 200, and has long grooves 45a and 45b. The long grooves 45a and 45b are formed in parallel with a Z direction as the vertical direction. The long grooves 45a and 45b are formed in wall surfaces 45f and 45g of the case 45 in the Z direction. This Z direction is a direction vertical to the optical axis OP. The pins 41a of the light source holder 41 are fitted in the long grooves 45a, respectively. Besides, the ribs 41b of the light source holder 41 are fitted in the long grooves 45b, respectively.

The member 46 having the cam is also called a housing of the light source mounting device, and has cam slant surfaces 46a at wall surfaces 46f and 46g.

The pins 41a are movably received in the long grooves 45a of the case 45 movably in the Z direction, and similarly, the ribs 41b are positioned in the long grooves 45b so as to be able to move up and down in the Z direction. Thus, the light source portion 200 including the light source holder 41 can move up and down in the Z direction.

Figure 8:
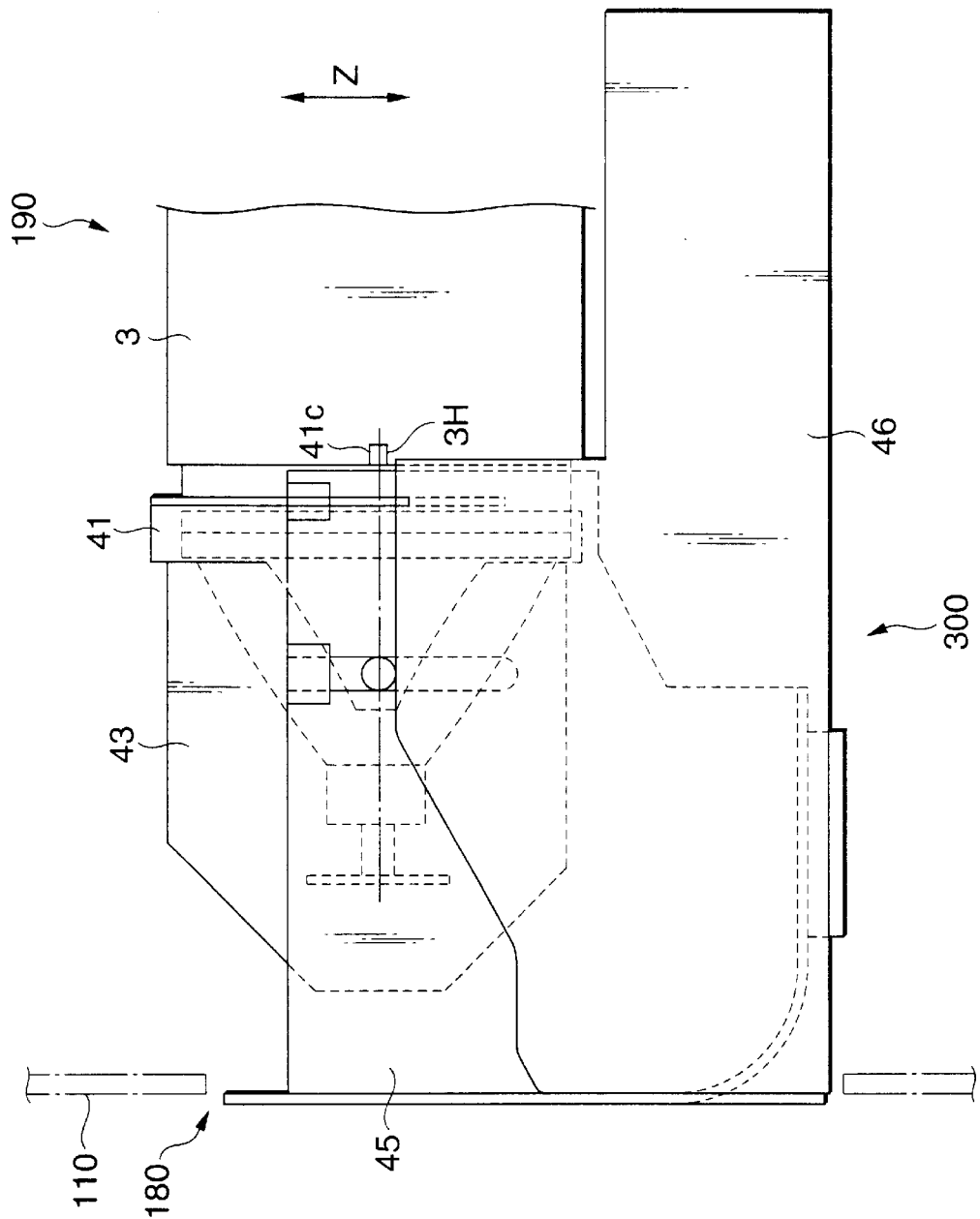
FIG. 8 is a view showing a state where the light source portion is positioned from the position of the opening used for taking in and out the light source to a normal position.

The light source holder 41 is provided with, as shown in FIG. 8, two pins 41c and 41c for positioning the light source 2 at a normal position 190 with respect to the optical block 3.

Next, an operation example of the light source mounting device 300 shown in FIG. 6 will be described with reference to FIGS. 7 and 8.

In FIGS. 7 and 8, a position 180 of an opening used for taking in and out a light source is located at the side of a front portion 110 of the lower portion 103 of the housing 101 of FIG. 1, and FIGS. 7 and 8 show the position 180 of the opening used for taking in and out the light source and the normal position 190. The normal position 190 is a correct attachment position of the light source 2 with respect to the optical unit 3. As shown in FIGS. 7 and 8, the normal position 190 is located at an upper position in the Z direction as compared with the opening 180 for taking in and out the light source.

First, as shown in FIG. 7, the case 45 is located at the position 180 of the opening used for taking in and out the light source from the outside of the front portion 110 of the lower portion of the housing. In this case, the light source portion 200 is already contained in the case 45. That is, FIG. 7 shows the state where the case 45 is drawn from the front portion 110 of the lower portion of the housing, and is in a position at the time when the light source 2 is replaced. With respect to the replacement of the light source 2, only the light source 2 may be replaced. However, since the replacement operation becomes troublesome, the light source 2, the light source holder 41, the fixing spring 42 and the light source case 43 may be replaced as one body, or the light source 2, the light source holder 41, the fixing spring 42, the light source case 43 and the case 45 may be replaced as one body.

Here, a description will be made on a case where the light source 2, the light source holder 41, the fixing spring 42, the light source case 43, and the case 45 are replaced as one body.

In FIG. 7, when the user pushes the case 45 by hand and moves it in an X direction (right direction in FIG. 7), the pin 41a provided at the light source holder 41 reaches the lower portion of the cam slant surface 46a of the member 46 having the cam. In this state, when the case 45 is further moved in the X direction, since the pin 41a of the light source holder 41 goes up the cam slant surface 46a in an F direction, the light source holder 41 is moved in the Z direction (up direction).

The height H of the cam slant surface 46a shown in FIG. 7 is a height calculated from the normal position 190 of the light source 2, the position of the light source 2 and the pin 41a, and an outer diameter of the pin 41a.

When the case 45 is further moved in the X direction, the pin 41a reaches the highest position of the cam slant surface 46a. When the case 45 is moved in the X direction, the light source holder 41 horizontally moves in the X direction, and the two pins 41c provided at the light source holder 41 are inserted in the holes 3H provided in the optical block 3 as shown in FIG. 8.

By this, the light source 2 is correctly positioned and disposed at the normal position 190 through the light source holder 41.

On the contrary, in the case where the light source is lowered from the normal position 190 to the opening 180 used for taking in and out the light source and is taken out, an operation reverse to the foregoing operation has only to be performed. In this case, as shown in FIG. 7, the pin 41a goes down the cam slant surface 46a in a G direction, and as a result, the light source portion 200 lowers in the Z direction, and can be taken out to the outside from the front portion 110 of the lower portion.

Figure 9:
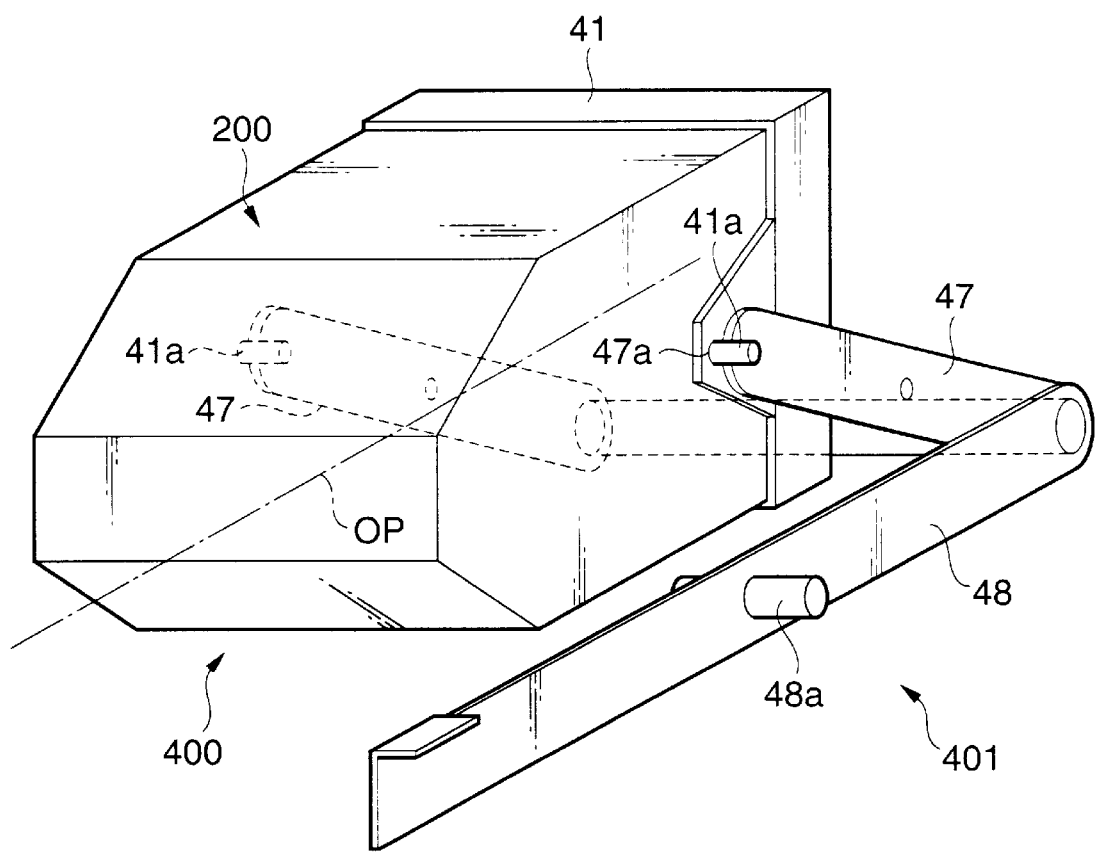
FIG. 9 is a perspective view showing an example of an optical source mounting device in another embodiment of the projection apparatus of the present invention.
Figure 10:
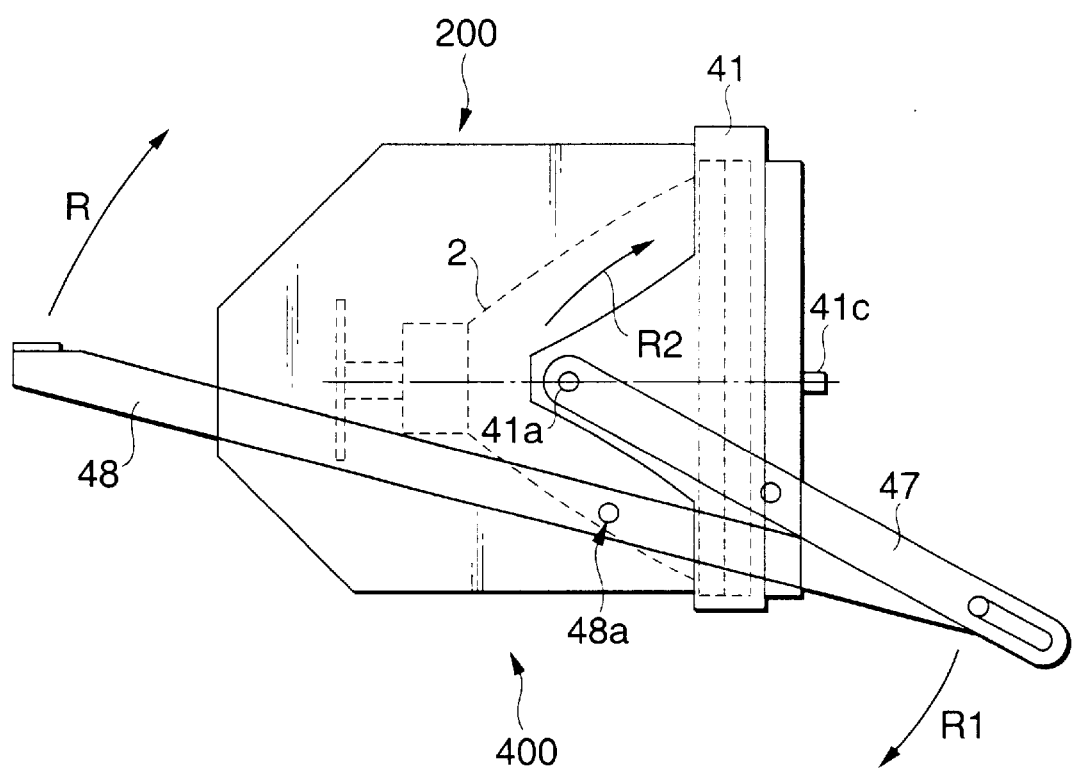
FIG. 10 is a view showing the state where a light source portion is positioned at a replacement position of a light source by the light source mounting device.
Figure 11:
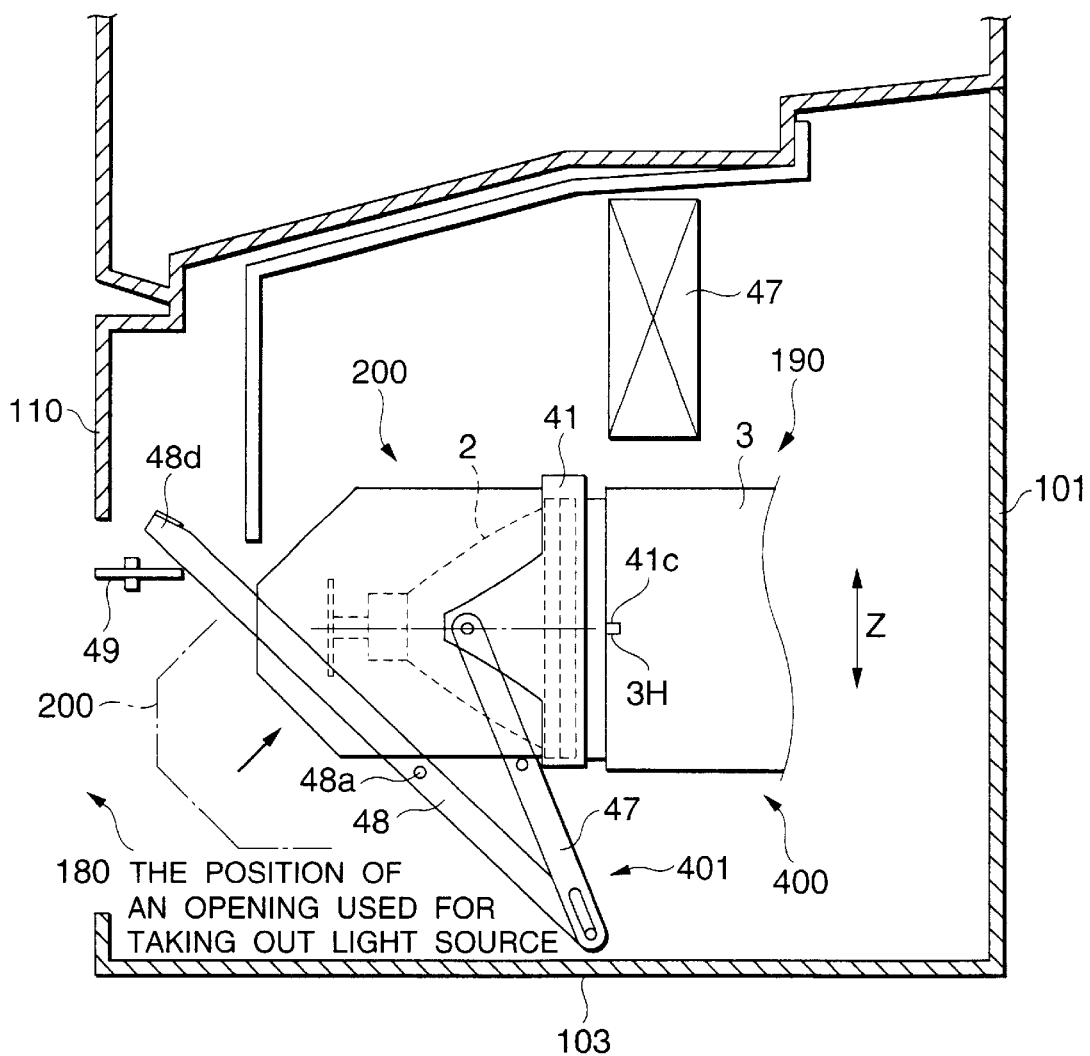
FIG. 11 is a view showing a state where the light source portion is positioned at a normal position.

Next, FIGS. 9 to 11 show another embodiment of a light source mounting device of a projection apparatus of the present invention.

A light source mounting device 400 is a device which, as shown in FIG. 11, pushes up a light source portion 200 from a position 180 of an opening used for taking out a light source at a front portion 110 of a lower portion of a housing to a normal position 190 to make positioning. Although the light source mounting device 300 of FIGS. 6 to 8 is of a cam system, the light source mounting device 400 of FIGS. 9 to 11 is of a so-called link system including a link mechanism portion 401.

The structure of the light source portion 200 is the same as the light source portion 200 shown in FIG. 5. As shown in FIG. 9 and FIG. 10, a light source holder 41 is provided with two pins 41a and 41a at positions symmetrical to the optical axis OP of the light source 2 and in the vicinity of the center of gravity of the light source portion 200. Two links 47 and 47 are fastened to the housing 46 to be able to rotate. A hole 47a is provided at one end of each of the links 47. The hole 47a is designed such that the pin 41a provided at the light source holder 41 can be detached, and the link 47 can rotate with respect to the pin 41a. One end of a push-up lever 48 is attached to the other end of each of the links 47 to be able to rotate with respect to the link 47. This push-up lever 48 is fastened to the side of the lower portion 103 of the housing 101 by a pin 48a so as to be able to rotate.

The state of the light source portion 200 shown in FIG. 9 shows a state indicated by an alternate long and short dash line of FIG. 11, and in this state, the light source portion 200 is disposed at the position corresponding to the position 180 of the opening used for taking out the light source. The link 47, the push-up lever 48, and the pins 41a and 48a constitute the link mechanism portion 401.

Next, an operation example of the light source mounting device 400 will be described with reference to FIGS. 9 to 11.

FIG. 9 and FIG. 10 show the position of the light source portion 200 indicated by the alternate long and short dash line in FIG. 11. At this position, the light source portion 200 is in a position for replacement of the light source 2. The way of replacing the light source 2 is the same as the already described system.

In FIG. 10, the pin 41a of the light source holder 41 is joined to the hole 47a of the link 47. The push-up lever 48 fastened to the link 47 is raised in an R direction of FIG. 10, so that the link 47 rotates around the pin 48a in an R1 direction, and the light source holder 41 fastened to the link 47 is lifted in the Z direction. By this, as shown in FIG. 11, the light source holder 41 rotates in an R2 direction and moves to the optical block 3 at the normal position 190 of the optical block 3.

Then, a pin 41c of the light source holder 41 is inserted in a hole 3H of the optical block 3, so that the light source portion 200 is lifted to the normal position 190 and is positioned.

In this case, the other end 48d of the push-up lever 48 is engaged with a lock lever 49 of the lower portion 103, so that the holding state of the light source portion 200 to the normal position 190 can be maintained.

On the contrary, in the case where the light source portion 200 is detached, when the user detaches the end 48d from the lock lever 49, the light source portion 200 lowers in the Z direction by its own weight from the position indicated by a solid line of FIG. 11 to the position indicated by the alternate long and short dash line, and returns to the side of the position 180 of the opening used for taking out the light source.

Next, still another embodiment will be described with reference to FIGS. 12 to 14.

Figure 12:
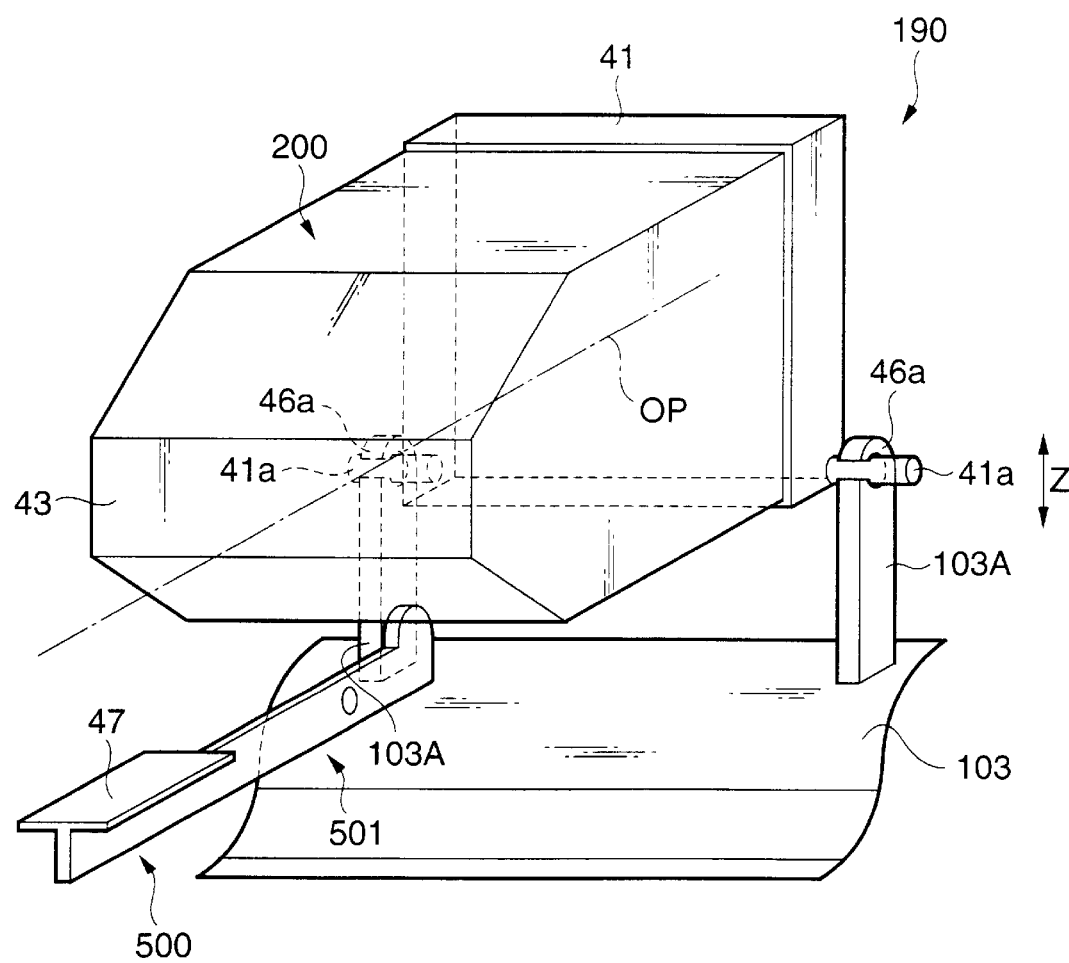
FIG. 12 is a perspective view showing an example of a light source mounting device in still another embodiment of the projection apparatus of the present invention.
Figure 13:
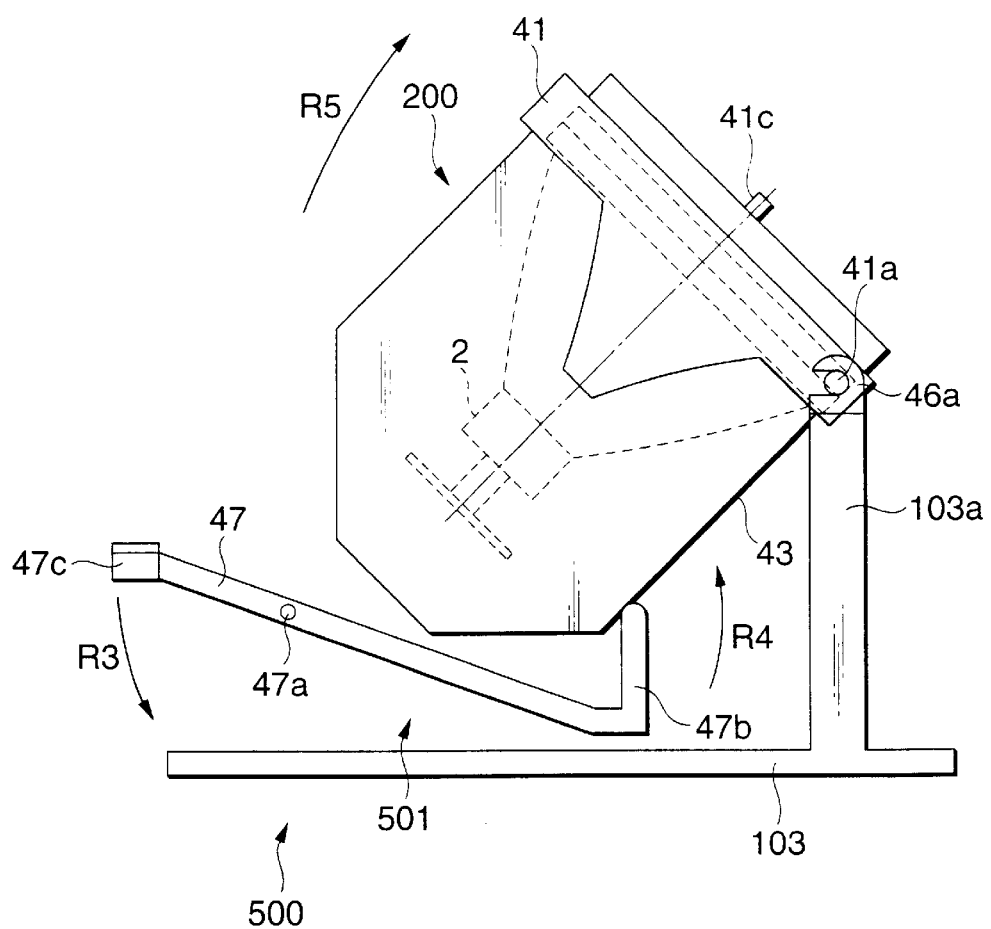
FIG. 13 is a view showing a state where a light source portion is held at a replacement position of a light source by the light source mounting device in FIG. 12.
Figure 14:
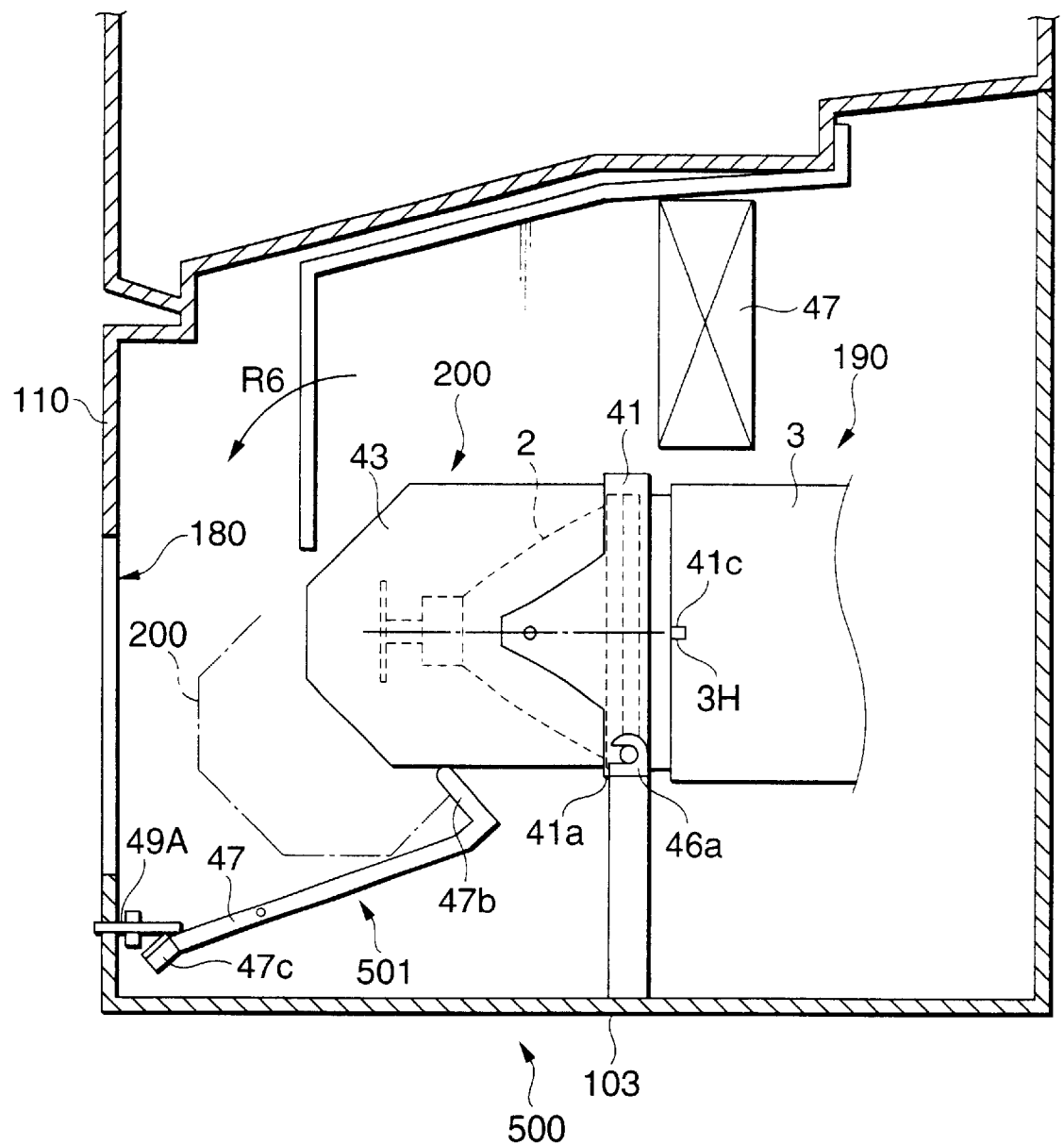
FIG. 14 is a view showing a state where the light source portion is positioned at a normal position.

FIGS. 12 to 14 show a light source mounting device 500 of a so-called rotation system. As a light source portion 200 shown in FIG. 12, one having the structure of FIG. 5 can be adopted.

A rotation operating portion 501 includes a pin 41a, a support 103A, and a lever 47. Two pins 41a are provided at a lower portion of a light source holder 41 and at left-right symmetric positions of an optical axis OP of a light source 2. Supports 103A and 103A are provided in a Z direction at the inner surface of a lower portion 103 of a housing. The pins 41a are detachably attached to holes 46a of the supports 103A, respectively. The pins 41a and 41a are the rotation center of the light source portion 200, and are in a direction normal to the optical axis OP and in the horizontal direction.

The lever 47 is attached to the lower portion 103 of the housing to be able to rotate around a shaft 47a. One end portion 47b of the lever 47 is in contact with the bottom of a light source case 43 and supports it. The other end 47c of the lever 47 is a portion which is pushed by the user. In the state of FIG. 12, the light source portion 200 is located at a normal position 190, and in the state of FIG. 13, the light source portion 200 is in a down position corresponding to a position 180 of an opening used for taking out a light source.

Next, an operation example of this rotation system light source mounting device 500 will be described with reference to FIGS. 12 to 14.

FIG. 13 and an alternate long and short dash line of FIG. 14 indicate the position at the time when the light source 2 of the light source portion 200 is replaced. The way of replacing the light source 2 is the same as the foregoing way. When the user pushes down the other end 47c of the lever 47 in an R3 direction, the one end 47b of the lever 47 is lifted in an R4 direction, so that the light source case 43 supported by the lever 47 is lifted in an R5 direction around the pin 41a.

By this, the light source portion 200 is raised to the optical unit 3 of the normal position 190 of FIG. 14 and is positioned. In this case, a pin 41c of the light source portion 200 is fitted in a hole 3H of the optical unit 3, so that the light source holder 41 can be positioned at the normal position.

In order to maintain the state where the light source portion 200 is lifted, the other end 47c of the lever 47 is fixed to a lock lever 49A of the lower portion 103.

On the contrary, in the case where the light source 2 is replaced, when the lever 47 is detached from the lock lever 49A, the light source portion 200 rotates in an R6 direction shown in FIG. 14 by its own weight around the pin 41a, so that it returns to the state of FIG. 13. In this state, the light source 2 may be replaced.

Figure 15:
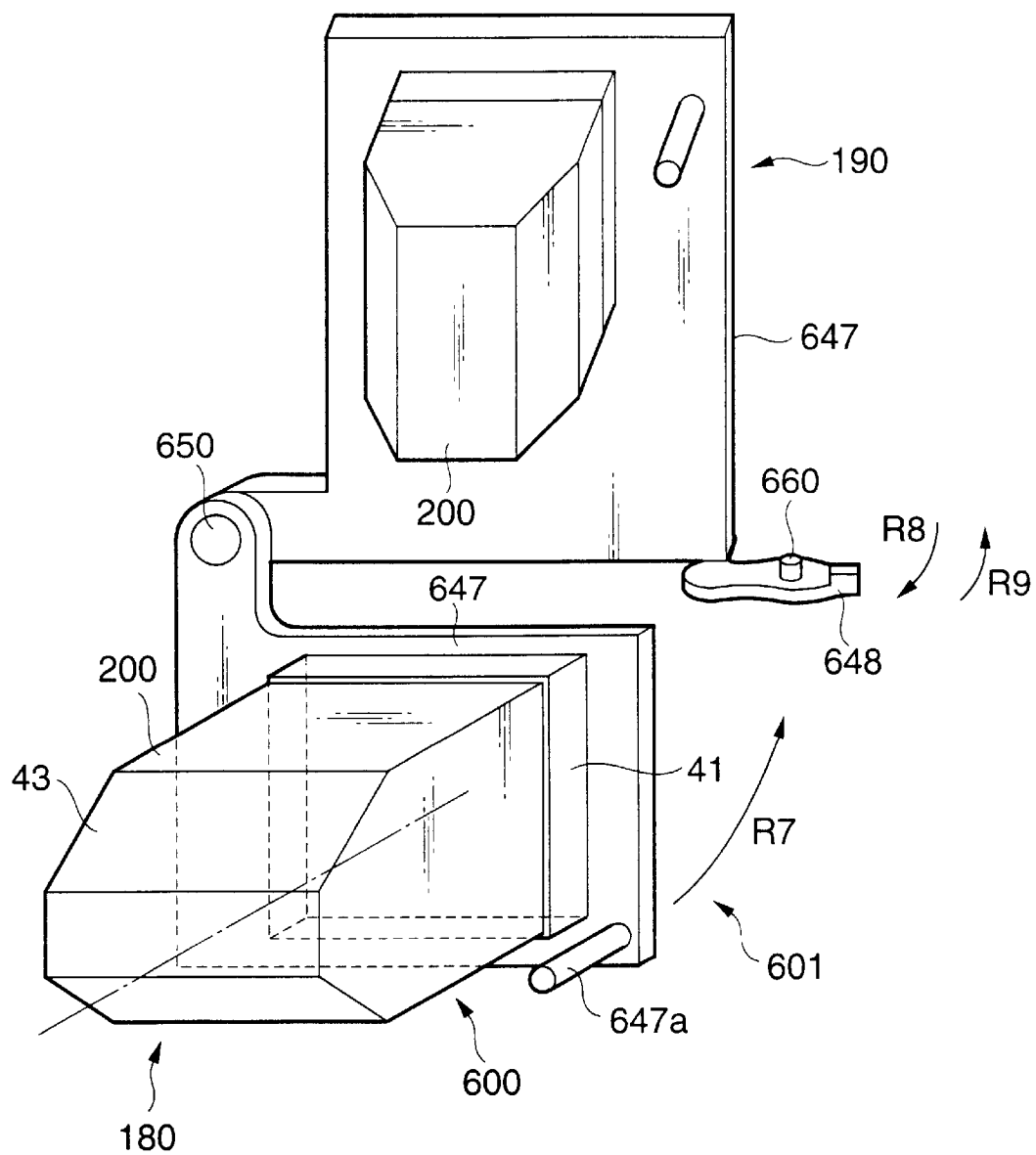
FIG. 15 is a view showing an example of a light source mounting device in still another embodiment of the projection apparatus of the present invention.

FIG. 15 shows still another embodiment of the present invention and shows an example of a light source mounting device 600 of a so-called turret system. In this example, as a light source portion 200, one similar to that shown in FIG. 5 can be adopted. A rotation operating portion 601 includes a light source holder attachment plate 647, a pin 650, a lever 647a, and a lock lever 648. A light source holder 41 includes the light source holder attachment plate 647. This light source holder attachment plate 647 is rotatably held to the lower portion 103 of the housing 101 of FIG. 1 through the pin 650. The lever 647a is provided at the light source holder attachment plate 647. When this lever 647a is rotated by about 90° around the pin 650 in an R7 direction, the light source portion 200 can be positioned from the position 180 of the opening used for taking out the light source to the normal position 190. In order to position and hold the light source portion 200 at the normal position 190, the lock lever 648 is used. This lock lever 648 can be rotated around a pin 660 in an R8 direction, and the lock lever 648 holds the light source holder attachment plate 647. In the case where the light source portion 200 is returned from the normal position 190 to the position 180 of the opening used for taking out the light source, when the lock lever 648 is returned in an R9 direction, the light source holder attachment plate 647 slips from the lock lever 648, so that the light source portion 200 can be returned to the position 180 of the opening used for taking out the light source.

Figure 16:
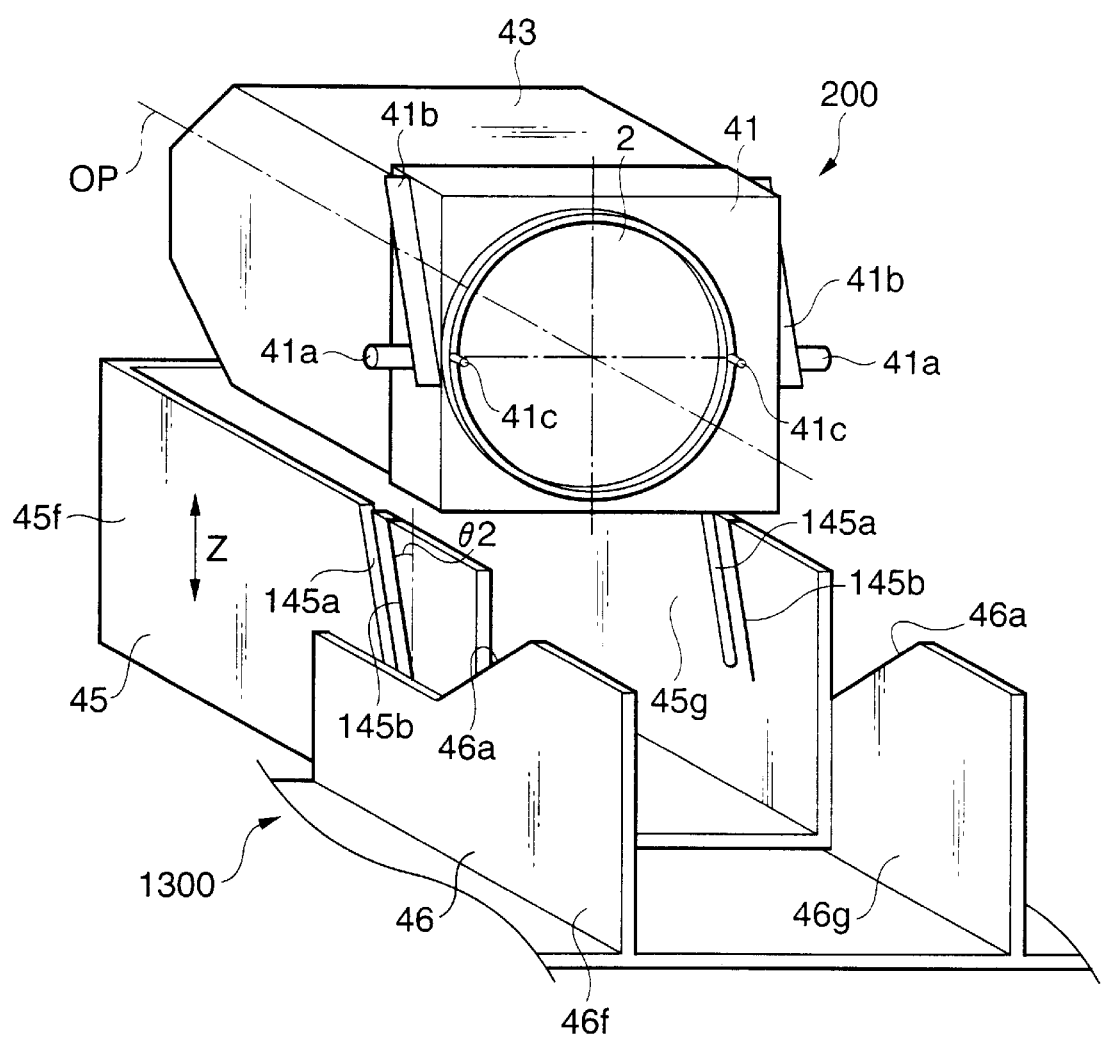
FIG. 16 is a perspective view showing an example of a light source mounting device in still another embodiment of the projection apparatus of the present invention.
Figure 17:
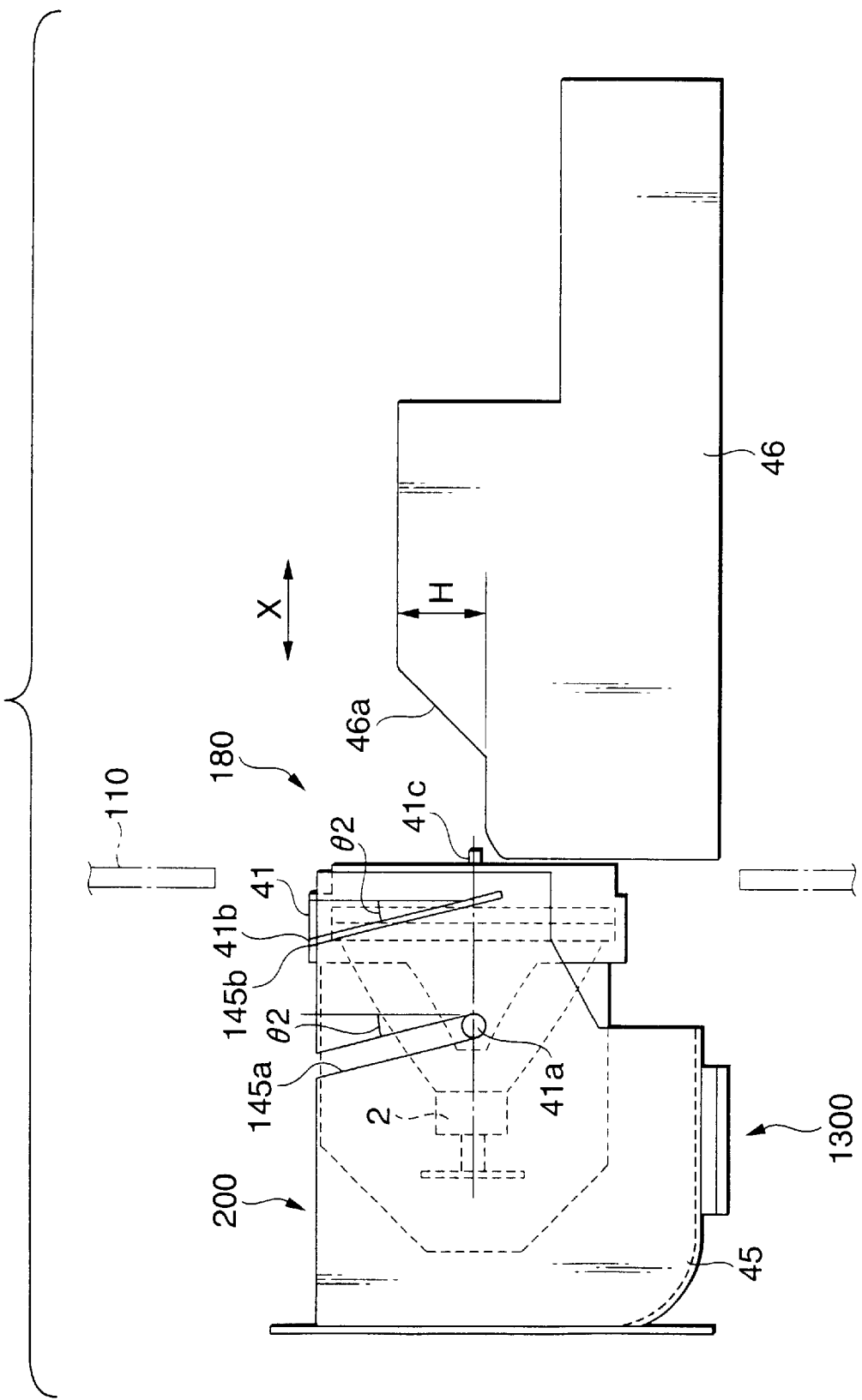
FIG. 17 is a view showing a state where a light source portion of the light source mounting device in FIG. 16 is positioned at a position of an opening used for taking in and out a light source.
Figure 18:
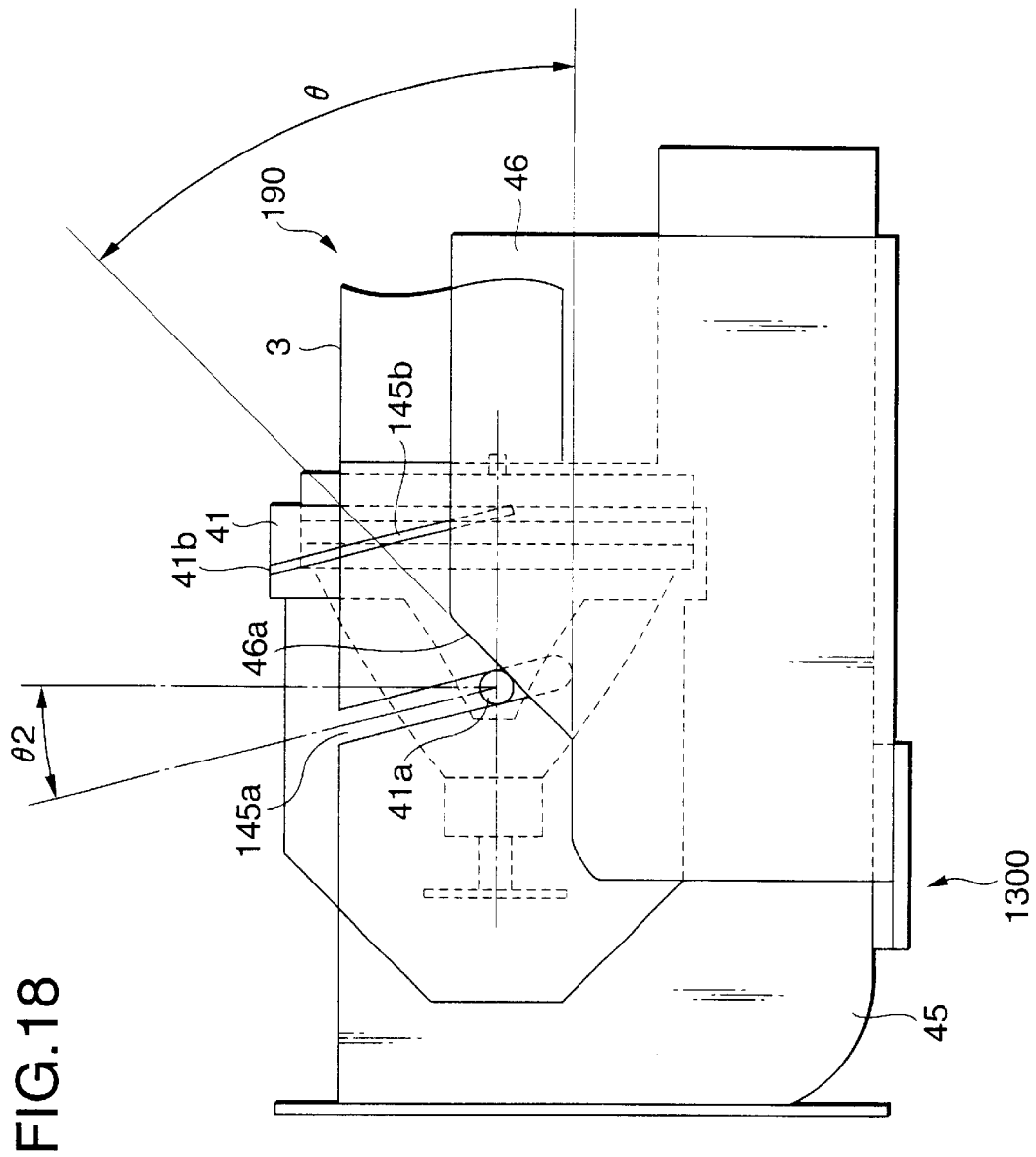
FIG. 18 is a view showing a state where the light source portion is positioned at a normal position.

FIGS. 16 to 18 show still another embodiment of the present invention. A light source mounting device 1300 of FIGS. 16 to 18 is different from the light source mounting device 300 of FIGS. 6 to 8 in the shape of long grooves 145a and 145b provided in a case 45. As shown in FIG. 18, the long grooves 145a and 145b are formed to be inclined at an angle θ2 with respect to the vertical line. On the other hand, a cam slant surface 46a of a member 46 having a cam is inclined at an angle of θ.

Figure 19:
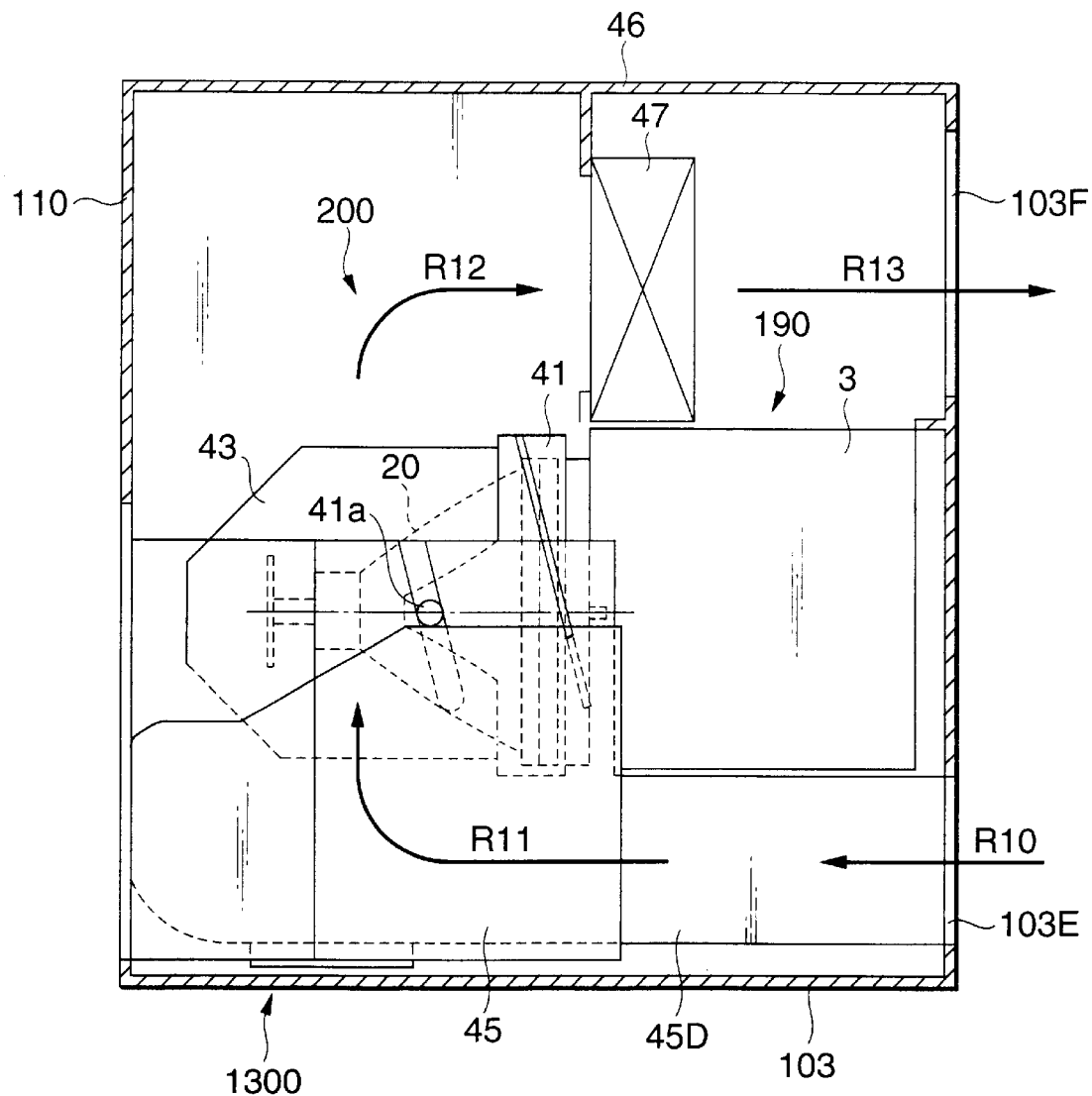
FIG. 19 is a view showing an example in which the light source mounting device of FIG. 18 is provided with cooling means of the light source.

Since the other points and structures of FIGS. 17 to 19 are the same as the light source mounting device 300 of FIGS. 6 to 8, their description will be used.

The state of FIG. 17 is a state where the light source portion 200 is taken out from the front portion 110 of the lower portion of the housing, and is a position at the time when the light source 2 is replaced. With respect to the replacement of the light source 2, although the already described way may be used, a description will be made on a case where the light source 2, the light source holder 41, the fixing spring 42, the light source case 43 and the case 45 are replaced as one body.

When the user moves the case 45 in the X direction, the pin 41a of the light source holder 41 reaches the cam slant surface 46a of the member 46 having the cam. In this state, when the case 45 is further moved in the X direction, since the pin 41a of the light source holder 41 goes up the cam slant surface 46a, it is moved in the upper direction. The height H of the cam slant surface 46a shown in FIG. 17 is a height calculated from the normal position 190 of the light source 2, the position of the light source 2 and the pin 41a, and the outer diameter of the pin 41a. When the case 45 is further moved in the X direction, the pin 41a reaches the highest position of the cam slant surface 46a.

When the case 45 is further moved in the X direction, the light source holder 41 horizontally moves, and the two pins 41c of the light source holder 41 are inserted in the holes 3H of the optical unit 3, and by this, the light source 2 is positioned at the correct position with respect to the optical unit 3. Here, the shape of the cam slant surface 46a is determined by a moving amount of the light source holder 41 in the horizontal direction, a moving amount thereof in the vertical direction, and a condition that the locus of movement of the light source holder 41 and the light source case 43 does not interfere with other structural parts. The angle between the cam slant surface 46a and the horizontal line is called a climbing angle θ of the cam, and if this angle exceeds 30°, force F needed to move the case 45 in the horizontal direction becomes large, so that the operationality becomes poor.

Then, as shown in FIG. 18, in the case where it is expected that the climbing angle of the cam slant surface 46a determined in accordance with the foregoing conditions exceeds 30° and the operationality becomes poor, as a countermeasure, the long grooves 145a and 145b provided in the case 45 are inclined at an angle θ2 satisfying (θ−θ2 =30°) in the opposite direction to the cam slant surface 46a, so that the operationality can be improved, and the light source 2 can be easily disposed at the normal position 190.

However, at this time, since the light source case 43 makes relative movement to the case 45 in the horizontal direction, when a relative movement amount is L, the gap between the end face of the case 43 and the case 45 needs the relative movement amount L+α. Besides, the movement amount of the case 43 in the horizontal direction becomes long by the relative movement amount L.

Next, still another embodiment of the present invention will be described with reference to FIG. 19.

In FIG. 19, a cooling fan for cooling the light source 2 is provided in the light source mounting device 1300 of FIG. 18. A cooling fan 47 for cooling the light source 2 is provided. When the cooling fan 47 rotates, heated air around the light source 2 is sucked, and instead of that, new cool air enters the surrounding of the light source 2, so that the light source 2 is cooled. In order to effectively cool the light source 2, it is necessary to use air of lower temperature. In a conventional apparatus, air of relatively high temperature having passed through other heat generating parts is used to cool. Thus, there is a tendency that a cooling effect of a light source is low.

In the embodiment shown in FIG. 19, a duct 45d as a flow path of air is provided in the case 45. An end of the duct 45d is connected to an opening portion 103E of the lower portion 103 of the housing. Besides, an opening portion 103F is provided in the lower portion 103 of the housing at the downstream side of the cooling fan 47.

When the fan 47 is rotated, cool air outside of the housing reaches the light source 2 from the opening portion 103E through arrows R10 and R11. After this cool air outside cools the light source 2, it is discharged through arrows R12 and R13 from the opening portion 103F to the outside. By doing so, the light source 2 can be efficiently cooled. That is, in the case where the light source portion 200 is positioned at the normal position 190 with respect to the optical unit 3, the light source 2 can be efficiently cooled.

According to the embodiment of the present invention, in the projection apparatus, also called a rear projection television, using the liquid crystal light valves, by using the plane cam for the mechanism of taking in and out a lamp, even if the lamp position is an offset position to the lamp takeout portion, replacement of the lamp can be easily made.

As described above, in the embodiment of the present invention, when the cam system is adopted, the two pins and two ribs at positions symmetrical to the optical axis of the light source are projected from the first case containing the light source, the second case having the long grooves in which the two pins and the two ribs can move only in the vertical direction to the optical axis of the light source exists outside of the first case, the two pins protrude from the second case and come in contact with the cam slant surface disposed at the housing, and the second case is moved in the optical axis direction of the light source, so that the light source can be raised to the normal position.

In the embodiment of the present invention, when the link system is adopted, the two first links are coupled to the housing and can freely rotate with respect to the coupling portion, the two pins at the positions symmetrical to the optical axis of the light source are projected from the first case containing the light source, the two pins and the two links are coupled through the holes provided in the links, and the two links are rotated by the second link or lever disposed in the housing, so that the light source can be disposed at the normal position.

In the embodiment of the present invention, when the rotation system is adopted, the two pins at positions symmetrical to the optical axis of the light source are projected from the lower portion of the first case containing the light source, the two pins are inserted in the two hole portions provided in the housing so that they become rotation axes, and the rear end of the first case is raised by the lever disposed in the housing, so that the light source can be disposed at the normal position.

In the embodiment of the present invention, when the turret system is adopted, the rotation plate rotatable in the vertical direction to the optical axis direction of the light source is disposed in the housing, this rotation plate is coupled with the first case containing the light source, and the rotation plate is rotated, so that the light source can be disposed at the normal position.

Further, in the embodiment of the present invention, the long groove provided in the second case is designed such that it is rotated in the direction in which an angle between the groove and the cam slant surface becomes large from the vertical direction to the optical axis of the light source, and the climbing angle of the cam slant surface for the two pins provided at the first case is made small, so that it is possible to lessen the force needed to move the second case in the optical axis direction of the light source.

When the second case is made also to function as a duct in which air for cooling the light source flows, cooling efficiency of the light source is raised.

According to the embodiments of the present invention, the following merits can be obtained.

Even in the case where the normal position of the light source is offset to the opening used for taking out the light source, it is possible to provide an inexpensive and highly reliable mechanism with less structural parts.

It is possible to provide a mechanism in which the operation at the time of replacing the light source is simple and certain.

By using the cam slant surface, even if the normal position of the light source is offset to the opening used for taking out the light source, the light source can be easily replaced. In the case where it is expected that the climbing angle of the cam slant surface becomes large and the operationality becomes poor, the countermeasure can be taken by partially correcting the structural parts, so that the freedom of design can be raised.

Since the number of structural parts is small, an inexpensive and highly reliable mechanism can be provided.

By making a part of the structural parts have the duct function for an air flow path, the cooling effect of the light source can be raised, and the lifetime of the light source can be extended.

Although the foregoing embodiments relate to the so-called three-plate type projection apparatus including the three liquid crystal light valves 6a, 6b and 6c, the invention is not limited to this, but a single plate type projection apparatus using one liquid crystal light valve may be naturally adopted.

What is claimed is:

1. An apparatus for projecting an image by using light of a light source within a housing comprising:
    a liquid crystal projection self-contained in said housing which projects an image by using light from said light source within said housing;
    a light source mounting device for inserting the light source into a light source holder so that the light source is mounted in the light source holder and is raised from a position from which the light source is inserted to a normal position;
    said light source mounting device further including means for completely removing said light source from said light source holder for rapid replacement of the light source.

2. A projection apparatus according to claim 1, and further including a case for supporting the light source holder movably in a vertical direction, and a member having a cam for raising the light source holder when the case is inserted and for positioning the light source to the normal position.

3. A projection apparatus according to claim 2, wherein the light source holder includes at least two pins protruding from both sides and two ribs protruding from both the sides,
    the ribs are inserted into first long grooves provided at both sides of the supporting case and hold a posture of the light source holder in a constant direction, and
    the pins are inserted in second long grooves provided at both the sides of the supporting case, and ends of the pins are brought into contact with the cam and move up and down along a cam shape.

4. A projection apparatus according to claim 3, wherein the light source holder includes a positioning pin provided vertically to an opening surface through which the light source radiates, and
    when the light source holder reaches the normal position, the pin is inserted in a positioning hole provided at an attachment surface of an opposite optical block so that positioning is made.

5. A projection apparatus according to claim 1, wherein the light source mounting device includes a link mechanism portion for raising the light source holder by moving the light source holder and for positioning the light source to the normal position.

6. A projection apparatus according to claim 5, wherein the light source mounting device includes two link members attached to the housing and rotatable at roughly a center portion, the light source holder is detachably and rotatably attached to one end of each of the link members through pins provided at both sides of the light source holder, and the other end of each of the link members includes a long groove, one end of the lever for rotating the link member is rotatably attached through the long groove, and the link member is rotated by moving the one end of the lever horizontally or vertically, so that the light source holder attached to the one end of the link member is moved.

7. A projection apparatus according to claim 6, wherein the light source holder includes a positioning pin provided vertically to an opening surface through which the light source radiates, and when the light source holder reaches the normal position, the pin is inserted in a positioning hole provided at an attachment surface of an opposite optical block so that positioning is made.

8. A projection apparatus according to claim 1, wherein the light source mounting device includes a rotation operating portion for positioning the light source by rotating the light source holder around an axis orthogonal to an optical axis of the light source to move the light source to the normal position.

9. A projection apparatus according to claim 8, wherein the light source holder includes two pins near an opening through which light is radiated and at a lower portion of both sides, and the light source holder is detachably and rotatably attached to one end of each of support members provided at the housing of the projection apparatus through the pins.

10. A projection apparatus according to claim 9, wherein the light source holder includes a positioning pin provided vertically to an opening surface through which the light source radiates, and when the light source holder reaches the normal position, the pin is inserted in a position hole provided at an attachment surface of an opposite optical block so that positioning is made.

11. A projection apparatus according to claim 2, wherein the light source mounting device includes a rotation operating portion for positioning the light source by rotating the light source holder around an axis parallel to an optical axis of the light source to move the light source to the normal position.

12. A projection apparatus according to claim 1, wherein the light source mounting device includes a case for supporting the light source holder movably in a direction inclined with respect to a vertical direction, and a member having a cam for raising the light source holder in the direction inclined with respect to the vertical direction when the case is inserted and for positioning the light source to the normal position.

13. A projection apparatus according to claim 12, wherein the member having the cam forms a duct of air, and the light source holder includes an air flow path for supplying cooling air through the member having the cam.

* * * * *